United States Patent
Weiler et al.

(10) Patent No.: US 8,175,998 B2
(45) Date of Patent: May 8, 2012

(54) METHOD AND EXPERT SYSTEM WITH EVOLUTIONARY ALGORITHM FOR VALUATING AN OBJECT

(75) Inventors: Adrian Weiler, Aachen (DE); Stefan Droste, Aachen (DE)

(73) Assignee: Inform GmbH, Aachen (DE)

( * ) Notice: Subject to any disclaimer, the term of this patent is extended or adjusted under 35 U.S.C. 154(b) by 557 days.

(21) Appl. No.: 12/423,144

(22) Filed: Apr. 14, 2009

(65) Prior Publication Data

US 2009/0259614 A1 Oct. 15, 2009

(30) Foreign Application Priority Data

Apr. 14, 2008 (EP) .................................... 08007274

(51) Int. Cl.
*G06F 17/00* (2006.01)
*G06N 5/02* (2006.01)

(52) U.S. Cl. ......................................................... 706/47

(58) Field of Classification Search ........................ None
See application file for complete search history.

(56) References Cited

U.S. PATENT DOCUMENTS

2004/0254901 A1 12/2004 Bonabeau
2008/0046368 A1* 2/2008 Tidwell et al. .................. 705/44

FOREIGN PATENT DOCUMENTS

EP  1 081 655  3/2001

OTHER PUBLICATIONS

Hamed et al. "Dynamic Rule-ordering Optimization for High-speed Firewall Filtering", ASIACCS, 2006, pp. 11.*
Schultz et al. "Using a Genetic Algorithm to Learn Behaviors for Autonomous Vehicles", AIAA Guidance, Navigation and Control, 1992, pp. 1-12.*
Eiben & J. Smith: "Introduction to Evolutionary Computing" [online], Oct. 2007, Springer Vlg., XP002497483, ISBN: 9783540401841.
Anonymous: "Genetic algorithm", Wikipedia, The Free Encyclopedia [online] Feb. 28, 2008, XP002497480.
Ansaf Salleb-Aouissi et al.: "Quantminer: A Genetic Algorithm for Mining Quantitative Association Rules", in: Proceedigs of the International Joint Conferences on Artificial Intelligence [online] Jan. 2007, pp. 1036-1040, XP002497481.

(Continued)

*Primary Examiner* — Jeffrey A Gaffin
*Assistant Examiner* — Li-Wu Chang
(74) *Attorney, Agent, or Firm* — Von Rohrscheidt Patents

(57) ABSTRACT

A method for valuating an object is disclosed, which includes an expert system that determines a value for a rule from the features of the object, weights the value with a weight from [0, 1] and valuates the object based on the value with a rule editor for defining rules for the valuation with one respective weight from [0, 1]; a rule module for determining a value per rule from the features and a valuation module are also disclosed for valuating the object based on the values, wherein the valuation module weights each value determined for a rule with the weight associated with the rule; and in a simplified manner, the expert system determines temporal progressions of the weight in an evolutionary algorithm, commencing with a start value, and selects a limit of the weight as a new weight, when the weight is converging, and the evolution module determines temporal progressions of at least one weight in an evolutionary algorithm selecting a new weight based on a converging behavior of the characteristics.

8 Claims, 1 Drawing Sheet

OTHER PUBLICATIONS

Alex Freitas: "A Survey of Evolutionary Algorithms for Data Mining and Knowledge Discovery" In: Advances in Evolutionary Computation [online] Aug. 2002, pp. 819-845 XP002497482, ISBN: 3-540-43330-9.

Takagi Hideyuki: "Interactive Evolutionary Computation: Fusion of the Capabilities of EC Optimization and Human Evaluation", in: Proceedings of the IEEE, IEEE, New York, vol. 89, No. 9, Sep. 1, 2001, pp. 1275-1296, ISSN: 0018-9219.

* cited by examiner

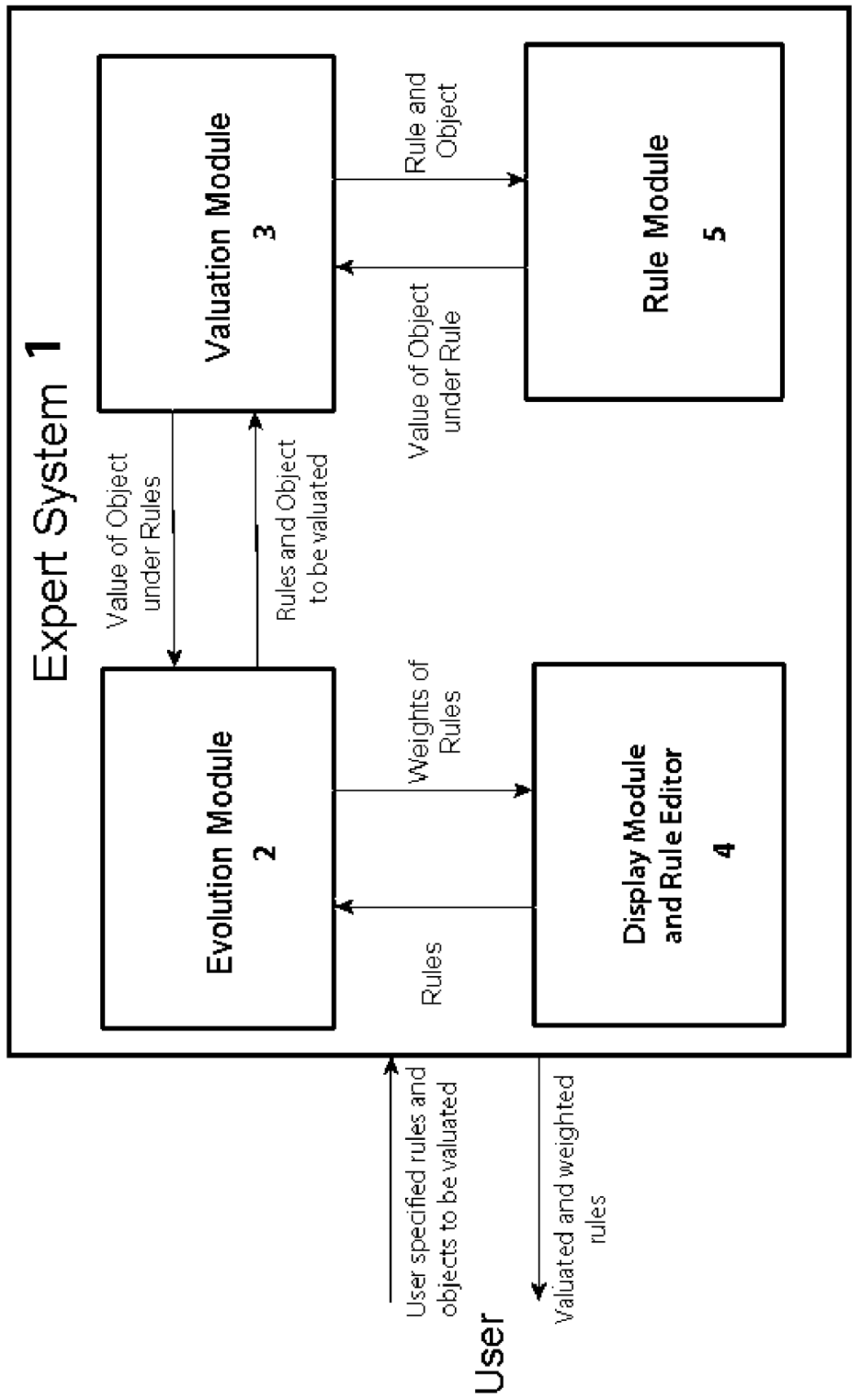

METHOD AND EXPERT SYSTEM WITH EVOLUTIONARY ALGORITHM FOR VALUATING AN OBJECT

CROSS-REFERENCES TO RELATED APPLICATIONS

This application claims the priority of European Patent Application Serial No. 08 007 274.7, filed Apr. 13, 2008, pursuant to 35 U.S.C. 119(a)-(d), the subject matter of which is incorporated herein by reference.

BACKGROUND OF THE INVENTION

The present invention relates to a method for valuating an object, and in particular to a method wherein an expert system determines a value from the features of the object for a rule, weights the value with a weight from [0, 1] and valuates the object based on the value. The present invention also relates to an expert system for valuating an object based on features of the object, with a rule editor for defining rules for the valuation with a respective weight from [0, 1] and a rule module for determining a value per rule from the features and a valuation module for valuing the object based on the values.

Persons skilled in the art designate computer program products as "expert systems", which can be directly loaded into a random access memory of a computer, and which comprise software codes for performing the described functions, when the computer program product is executed on the computer. Synonymously, also the computer on which said computer program product is executed is designated with the same term.

Methods and expert systems as described supra are used in particular to valuate the likeliness of a fraud attempt for a request to perform a credit card transaction as an object of the valuation. The detection of fraudulent transactions either with credit cards or other electronic payment systems is an equally serious and complex problem. A conclusion if a transaction has a fraudulent background must be made under very tight time constraints. In order to accomplish this with a high level of reliability, an entire history of transaction data has to be considered, since each particular transaction to be valued does not include enough information for this purpose. Due to the enormous number of occurring transactions, detecting patterns of fraudulent transactions is a very difficult task, even for an expert. Selecting the correct rule base, so that as many fraudulent transactions are detected as possible, without putting regular transactions under suspicion erroneously, is a very complex task, even for experts. Therefore, an expert system should be capable to give indications of improvement possibilities of the decision criteria employed.

EP 1 081 655 A1, which is held by the applicant, discloses an expert system which uses fuzzy formulated rules for the valuation and which determines the weights for the rules through training with a neuronal network. Other generally known systems are exclusively based on neuronal networks, in which the rules can hardly be interpreted either. Therefore, it is desirable, when the decision basics of the system are described in a form that is understandable more easily, e.g. in the form of fuzzy formulated rules.

The expert system known from EP 1 081 655 A1 enables the user to predetermine the decision criteria used or to influence them. Though it comprises high reliability, thus a high likeliness for detecting fraud attempts with a low rate of wrong positive results, however, the adjustment of the rule weighting by neuronal networks is performed without a human operator being able to trace the particular reasons. The mathematical complexity, which is inherent to the expert system, thus prevents to a large extent that know-how of the user is considered in the adaption of the rule weights.

Bentley et al. disclose the development of complex fuzzy formulated rules for detecting fraudulent credit card transactions by means of an evolutionary algorithm in the "Fuzzy Darwinian Detection of credit card fraud" (conference proceedings of the 14th Annual Fall Symposium of the Korean Information Processing Society, October 2000). The rules are developed in a single execution of the evolutionary algorithm and used for fraud detection; a manual modification during operation is not possible. The operator also has no option to specify the rules himself. The described expert system, as matter of principle, cannot interact with the user in a useful manner. The results of the evolutionary algorithm are always taken over by the system unconditionally.

It would therefore be desirable and advantageous to provide an improved method for valuating an object and to provide an expert system to obviate prior art shortcomings and to simplify such expert systems by allowing the operator to interact with the expert system.

SUMMARY OF THE INVENTION

According to one aspect of the present invention, an expert system includes determining a temporal progression of the weight in an evolutionary algorithm, starting with a start value, and upon convergence of the weight selects a limit of the weight as a new weight.

According to another aspect of the invention a method for valuating an object with an expert system includes assigning to a weight for a rule a starting value from a range [0,1], determining a temporal progression of the weight with an evolutionary algorithm, identifying convergence of the weight to a limit value, selecting the limit value of the weight as a new weight, determining under the rule a value of the object from features of the object, weighting the value of the object with the limit value of the weight, and valuating the object based on the weighted value of the object.

It is a further aspect of the present invention to provide an expert system for valuating an object based on features of the object and which includes a rule editor for defining rules for the valuation, a rule module for determining a value for each rule from the features of the object, a valuation module for valuating the object based on the determined values, wherein the valuation module weights each determined value with a respective weight in a range [0, 1] associated with each rule, and an evolution module configured to execute an evolutionary algorithm, determine a temporal progression of at least one weight and select a new weight based upon a convergence of the temporal progression.

The present invention resolves prior art problems by applying the rules defined by a human operator not only as intended, but they are furthermore automatically valuated themselves with respect to their relevance, and supplied with a new, possibly revised weight according to said valuation. In the context of the method according to the invention, the convergence of the weight of the rule in an evolutionary algorithm is the criterion for the relevance of a rule.

Based on the known methods, it is proposed according to the invention, that the expert system determines a temporal progression of the weight in an evolutionary algorithm, starting with a start value, and selects a limit of the weight as a new weight, when the weight converges. In the context of a method according to the invention, the rules defined by a human operator are not only applied as intended, but they are furthermore automatically valuated themselves with respect to their relevance, and supplied with a new possibly revised weight according to said valuation. In the context of the method according to the invention, the convergence of the weight of the rule in an evolutionary algorithm is the criterion for the relevance of a rule.

Evolutionary algorithms often provide heuristical methods which are easy to apply and flexible, when optimizing target functions with unknown, however, substantially continuous characteristics. They use basic principles of natural evolution for optimization by mutating, recombining and selecting elements of the search space (so-called individuals), wherein said loop of mutating, recombining and selecting is repeated several times. An evolutionary algorithm has several advantages for optimizing the weight factors. On the one hand, the influence of the weight factors upon the quality of the overall performance of the system may be traceable for each particular rule, but it is difficult to estimate for the entirety of the rules. When e.g. the weight factors of four or five rules are changed simultaneously, it is very complex to calculate in most cases with classic optimization methods, how the quality of the optimization of the resulting system changes.

The change of the detection quality of the expert system is rather low in most cases when minor modifications of the weights of the rules are performed, since all operators which are used for valuating fuzzy formulated rules (in particular inference, aggregation and defuzzying) show "smooth", thus continuous characteristics. For example, when one of the fuzzy-sets which contributes to the aggregation, gets a slightly revised weight factor, then all prevalent aggregate functions, like the maximum function, will only generate a slightly revised fuzzy-set, which in turn only causes a small change in the output in most defuzzying methods, like e.g. "center of gravity".

The convergence of the characteristics of the weight in an evolutionary algorithm can easily be interpreted as an indication of the quality of the selected weight automatically, as well as, intuitively by the human operator. Non-converging or only slowly converging characteristics indicate a hardly relevant weight; quickly converging characteristics indicate a highly relevant weight. For a weight which assumes a certain value already early in the evolution and which maintains said value, it can be supposed that said value is good, irrespective of the other weights. Weights which, on the other hand (depending on the characteristics of other weights), first go through a transient oscillation, or which oscillate apparently depend on other weights. The associated rules should thus be viewed in conjunction.

A method according to the invention thus, on the one hand, facilitates automatic adjustment of the weights; on the other hand, it facilitates generating mathematically grounded and traceable proposals for the manual adaptation or for any intermediary stages between pure automatism and a purely manual operation. The operator of a method according to the invention, on the one hand, intuitively detects the quality of the selected weights and can, on the other hand, align an automatically suggested change with his know-how and can manually correct said change accordingly.

Preferably, the expert system selects a new weight below the start value, when the weight does not converge after a critical time. Implementing a critical time for the convergence of the evolutionary algorithm in turn can be visualized and traced easily. Reducing the weight when there is insufficient convergence stabilizes the entire system. Preferably, the rule in a method according to the invention is a logical connection of numerical categorial and/or fuzzy terms. Through the limitation to fuzzy terms and through the possibly required rephrasing, at least particular rules in the known method are not traceable anymore for the human operator. For example, the test if the person requesting a credit card transaction is male or female cannot be formulated fuzzy in a sensible manner, since the modeling of such precise concepts contradicts the sense of fuzzy logic to model inherently imprecise properties. The method according to the invention already simplifies the understanding of the user by the possibility to formulate two-valued criteria, like e.g. the gender, also in a two-value manner. The linking of various criteria, in particular also of numerical categorial and/or fuzzy formulated terms with criteria of the respective other types into "hybrid" rules furthermore facilitates formulating human "know-how". The logical linking through operators of fuzzy logic as an extension of Boole's logic facilitates arranging criteria dependently.

Furthermore, a rule is hierarchically linked with other rules from a rule base of the expert system, preferably in the context of a method according to the invention to valuate the object, so that the conclusion of a rule is used to determine the premise of another rule. In particular, numerical, categorial and/or fuzzy conclusions of the other rules are logically composed in the context of such a method according to the invention.

Based on the known expert systems, it is proposed according to the invention to provide an evolution module for determining a temporal progression of at least one weight in an evolutionary algorithm and for selecting a new weight based on a convergent behavior of the characteristic, and to provide a display module for visualizing the characteristic and for visualizing the optimum weight. Said component facilitates a result oriented execution of one of the methods described supra for a human operator, in particular by means of the graphic illustration of the valuation of the rules. Thus, an expert system according to the invention comprises the advantages described supra compared to prior art expert system.

Based on the known expert systems, it is proposed according to the invention to provide an evolution module for determining a temporal progression of at least one weight in an evolutionary algorithm and for selecting a new weight based on a convergent behavior of the characteristic, and to provide a display module for visualizing the characteristic and for visualizing the optimum weight. Said component facilitates a result oriented execution of one of the methods described supra for a human operator, in particular by means of the graphic illustration of the valuation of the rules. Thus, an expert system according to the invention comprises the advantages described supra compared to prior art expert system.

In a preferred application of an expert system according to the invention, the object of the valuation is a business transaction or a person or a physical object, and the valuation provides an assessment of the risk associated with said object. In a particularly preferred application, the business transaction is a financial transaction and the risk is a fraud attempt, in particular using a credit- or debit card, or in electronic payment transactions.

Alternatively, the method according to the invention and the expert system according to the invention can be used in general for valuating any object in principle. Not only the precise risk determination, when detecting risk prone entities, e.g. potentially insolvent customers or customers not willing to pay, or fraud suspicious business transactions and transactions in the banking- and insurance field, but also applications in the context of a CRM-system for determining customers for who a specific product offering, could be of interest.

BRIEF DESCRIPTION OF THE DRAWINGS

FIG. 1 illustrates an expert system according to the invention.

DETAILED DESCRIPTION OF PREFERRED EMBODIMENTS

Other features and advantages of the present invention will be more readily apparent upon reading the following description of a currently preferred exemplified embodiment of the invention.

The expert system 1 according to the invention includes an evolution module 2, a valuation module 3, a display module and rule editor 4 and a rule module 5. The expert system 1 provides the option to the user to independently change the weight of the hybrid rules selected by him and to independently change the rules themselves. For support purposes, said expert system offers various illustrations of the execution of an evolutionary algorithm executed in the background, which algorithm arranges the rules according to their relevance. The system according to the invention can process hybrid rules, in which the premise and the conclusion include imprecise (fuzzy) and precise (dual-value) numerical or categorial requirements, and thus the system facilitates a much simpler and more intuitive modeling of the user know-how for the user.

A technical system for detecting fraudulent transactions should certainly do primarily exactly that, thus detect fraudulent transactions without erroneously classifying regular transactions as fraudulent. If this can be accomplished, directly depends on the decision criteria employed by the system. The expert system according to the invention does not select these decision criteria independently, but it actively supports the user in selecting these decision criteria in the best manner possible.

For this purpose, the decision criteria are modeled so that they can be interpreted and modified easily and so that they can be valuated quickly at the same time. The expert system furthermore provides assistance to the user, when improving the rules. The expert system according to the invention fulfills these requirements by modifying plural algorithmic techniques, combining them according to their strengths, and expanding them in a novel manner.

The user can specify a number of "hybrid" rules, which represent his decision criteria. Thus, said rules can follow the customary dual-value logic (e.g. "when age=65, then fraud=no"), in which the premises, as well as the conclusion, can only have the logical value 0 or 1 respectively. The rules can also be formulated fuzzy (e.g. "when age=high AND amount=low, then fraud=unlikely"), wherein the premise and the conclusion are comprised of logical connections of the requirements for the values of the input variable, which are provided by fuzzy-sets. Contrary to the classical logic, "imprecise", truth values between 0 and 1 are also possible. Since human know-how in most cases cannot be reduced to a purely binary decision, very often only this modeling facilitates an appropriate representation of human know-how in a technical system.

Categorial rules constitute an additional form in which inclusion of the data in certain categories is verified (e.g. "when gender=male, then . . . "). This form of rules is of particular advantage for detecting fraudulent transactions, since a plurality of categorial data is provided in said application.

When some of the variables to be processed are real numbers, then numerical rules ("when age between [65, 80]1, then . . . ") facilitate modeling expert know-how. Therefore, this form of rules is explicitly supported.

The various rule types (dual-value, categorial, numerical, fuzzy) can also be combined at will: classical dual-value logic terms, fuzzy formulated terms and categorial requirements can be combined in the premise at will. The conclusion only includes one term respectively. Since fuzzy logic generalizes the dual-value logic, the valuation of all rules is performed by known fuzzification, inference- and aggregation, and defuzzification methods of fuzzy logic.

Furthermore, a hierarchical configuration of the rules is possible: the outputs of (even of "hybrid") rules can be used as inputs of subsequent "hybrid" rules. Only this facilitates to transfer structured expert know-how, which is quite frequently based on a plurality of rules building on each other, directly into a rule system.

The user can modify and expand the employed fuzzy-sets, categories and rules at will until they are sufficient according to his opinion to detect fraudulent transactions. Furthermore, he can also specify rules in which he is not sure if this is the case, since the rules can comprise a weight, a real number from [0, 1], by which the result of the rule is multiplied. This weighting allows the user to classify rules according to their importance: a rule whose utility is only supposed by the user can be given a low weighting. This is relevant in particular in conjunction with the evolutionary improvement of the rule weights.

The expert system according to the invention supports the user by an algorithm running in the background, which develops a weight for each existing rule, so that the resulting overall system has a detection rate of fraudulent transactions, which is as high as possible, without falsely classifying regular transactions.

The weights are developed in the expert system for fraud detection according to the invention. The evolutionary algorithm thus starts with rule weights specified by the user as "start value", and mutates them in a first step. In order to achieve small changes with high probability at the mutation, a normal distributed random variable with an expectation value of 0 and with adjustable variance is added to each weight. Recombination generates a new search point from two search points, combining their advantages if possible. Since each weight is a real number from [0, 1], in particular the so-called intermediary recombination is used, which forms the arithmetic mean of the respective component of the generating vectors for each component. Alternatively, also other recombination methods, as they are provided by the evolution theory, are being used.

The number of the individuals to be generated by mutation and recombination can be adjusted by the user, as well as the selection, which selects the best either only from the new individuals, or also from the old individuals. The quality valuation of an individual made of weights is thus performed according to the recognition rate of the expert system, when using said weights based on an adjustable history of transaction data.

The evolutionary optimization can be triggered at any point in time, and can thus always inform the user regarding the best weights found presently. Based on said information, the user can modify the rules interactively at any point in time. The expert system according to the invention provides all options of a modern graphic user interface to the user, in order to select rules, or to illustrate their characteristics graphically. By means of these extended options, the user can derive much more information from the evolutionary algorithm, than from the knowledge of the best solution alone. After the revision of the hybrid rules and of their weights, the evolutionary algorithm can be started again. Thus, the user can develop the decision criteria in constant interaction with the graphically illustrated results of the evolutionary algorithm, in order to improve the expert system according to the invention, or to adapt it to a recently occurred fraud pattern.

While the invention has been illustrated and described as embodied in valuation method with an expert system, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method for valuating an object with a computer system, comprising the steps of:
    assigning start value in a range from 0 to 1 to a weight for a rule;
    determining a temporal progression of the weight in the range from 0 to 1 with an evolutionary algorithm;
    identifying convergence of the weight to a limit value;
    selecting the limit value of the weight as a new weight;
    determining a value of an object under the rule from features of the object;
    weighting the value of the object with the new weight to form a weighted value of the object; and
    valuating the object based on the weighted value of the object,
    wherein an expert system is implemented in a computer, includes a rule base and the rule is hierarchically combined with additional rules from the rule base,
    wherein numerical, categorial or fuzzy conclusions, or a combination thereof, of the additional rules are logically combined to form a premise of the rule.

2. The method of claim 1, further comprising the steps of:
    defining a critical time period;
    determining if the weight has converged during the critical time period; and
    selecting a new weight less than the starting value if the weight has not converged after expiration of the critical time period.

3. The method of claim 1, wherein the rule has a premise including a logical combination of at least two of numerical, categorial and fuzzy terms.

4. A computer system for valuating an object based on features of the object, comprising:
    a processor;
    a rule editor for defining rules for a valuation;
    a rule module for determining a value for each rule from features of an object;
    a valuation module for valuating the object based on the determined values for the rules,
    wherein the valuation module weights each determined value with a respective weight in a range from 0 to 1 associated with each rule, and
    wherein an evolution module configured to execute an evolutionary algorithm, determines a temporal progression of at least one weight and selects a new weight based upon a convergence of the temporal progression,
    wherein an expert system is implemented in a computer, includes a rule base and the rule is hierarchically combined with additional rules from the rule base, and
    wherein numerical, categorial or fuzzy conclusions, or a combination thereof, of the additional rules are logically combined to form a premise of the rule.

5. The computer system of claim 4, further comprising a display module for displaying the temporal progression.

6. The computer system of claim 4, further comprising a display module for displaying the new weight.

7. The computer system of claim 4, wherein the object of the valuation is a business transaction or a person or a physical object, and the valuation of the object provides an assessment of a risk associated with the business transaction.

8. The computer expert system of claim 7, wherein the business transaction is a financial transaction and the risk is a fraud attempt.

* * * * *